Patented June 7, 1938

2,119,993

UNITED STATES PATENT OFFICE 2,119,993

MIXED ALKYL-ALKANONYL ESTERS OF DICARBOXYLIC ACIDS

Lucas P. Kyrides, Webster Groves, Mo., assignor to Monsanto Chemical Company, St. Louis, Mo., a corporation of Delaware No Drawing. Application March 12, 1937, Serial No. 130,530

8 Claims. (Cl. 260—103)

The present invention relates to a new series of compounds, namely, neutral esters of dicarboxylic acids in which one carboxyl group is esterified by a ketone alcohol (hydroxyketone) and the other carboxyl group is esterified by a simple alcohol (alkyl carbinol) or their equivalents.

The compounds are of particular value in the plasticization of cellulose esters and ethers, vinyl resins, phenolaldehyde resins, etc. and are disclosed more fully in my co-pending application, Serial No. 604,660, filed on April 11, 1932, of which this application is a continuation-in-part. The use of the compounds of the present invention as plasticizers for various resins is disclosed in my co-pending applications Serial No. 130,531, filed on March 12, 1937, and Serial No. 142,801, filed on May 17, 1937.

The compounds of the invention result from the esterification of a dicarboxylic acid with the appropriate alkyl carbinol and the appropriate hydroxyketone, but are more readily prepared by using a chlorinated ketone instead of the hydroxyketone for the esterification. Thus, in the preparation of a typical compound, ethyl acetonyl phthalate, phthalic acid is partially esterified to the half ester with ethyl alcohol; the sodium salt of the half ester is then formed and subsequently reacted with chloroacetone. The reactions are simple and are easily controlled.

The compounds of the invention are named, for convenience, according to the International Union Rules, as far as the rules can be applied. Accordingly, ketones are named as alkanones, thus acetone is 2-propanone and ethyl methyl ketone is 2-butanone. The acetonyl radical (CH₃COCH₂—) is well recognized and need not be changed to the 2-propanonyl radical. However, in the further extension of the nomenclature, the monovalent radicals resulting from methyl ethyl ketone are called butanonyl radicals and the general term for the entire class of these radicals (—RCOR) is "alkanonyl". Accordingly, the compounds of the present invention are referred to as alkyl alkanonyl esters of dicarboxylic acids.

The dicarboxylic acids which may be used for the preparation of the compounds include acids of both the aliphatic and the aromatic series, for example, oxalic acid, succinic acid, diglycollic acid, sebacic acid, maleic acid, tartaric acid, malic acid, phthalic acid, isophthalic acid, terephthalic acid, naphthalene dicarboxylic acids, and substituted dicarboxylic acids such as chlorophthalic acid.

The alkyl carbinols which may be used for the partial esterification of the dicarboxylic acid may be monohydric alcohols or etherified polyhydric alcohols having a free alcoholic hydroxyl group. Suitable hydroxy compounds are methyl alcohol, ethyl alcohol, propyl alcohol, isopropyl alcohol, the butyl alcohols and higher homologues, monoethers of glycols and diethers of glycerol. Other methods of forming the half ester may also be resorted to, if desired. The remaining carboxyl group of the resulting half ester of the dicarboxylic acid is then esterified with a ketone alcohol (alkanonyl carbinol) or its equivalent; thus, by effecting the esterification by reaction of an alkanonyl halide (haloketone) with an alkali metal salt of the half ester.

Suitable alkanonyl halides are those resulting from the chlorination of acetone, ethyl methyl ketone (2-butanone) or homologues thereof. When mixtures of isomeric chloroalkanones are used the products are mixed isomeric alkyl alkanonyl esters. The mixed isomeric alkanonyl halides resulting from halogenation of simple ketones are quite suitable for the production of the compounds which are to be used as plasticizers.

As mentioned before, to prepare the compounds of the invention the acid is preferably partially esterified first to the half ester with the alkyl carbinol. The remaining carboxyl group is then neutralized with a base, for example, with sodium hydroxide, or carbonate and the resulting half-ester salt is reacted with the chloroketone.

The chloroketones may be used in pure form. Chloroketones are most readily prepared by the controlled chlorination of a ketone, which chlorination is usually conducted to a point short of the introduction of the total quantity of chlorine required for the production of the monochlorinated compound, that is, an underchlorinated mixture is prepared. This avoids the formation of any quantities of polychlorinated derivatives. The unchlorinated ketone is then separated from the monochlorinated derivative. For the purposes of the present invention it is advantageous to use an underchlorinated unpurified mixture containing free unchlorinated ketones instead of a pure chloroketone inasmuch as the products are all recovered at the end of the process by distillation and additional steps are thus avoided. Furthermore, whether or not a pure chloroketone is used at the start, the reaction is preferably conducted in the presence of additional quantities of the unchlorinated ketone or other solvent as diluent.

The mixture of isomeric ketones resulting from the chlorination of ketones more complex than acetone is not easily controlled to give one particular chloroketone to the exclusion of other isomers. When pure compounds are desired it is necessary to separate the desired compound from the isomeric mixture. However, in the production of plasticizers, the mixture of isomeric chloroketones is usable with substantially the same ultimate results.

The examples which follow describe particular compounds of the series contemplated by this invention and indicate specific methods for their production.

*Example 1.—Ethyl acetonyl phthalate.* One-half mole of phthalic anhydride (74 grams) is partially esterified with absolute ethyl alcohol (100 cc.) by heating under gentle reflux for three hours. To the mixture are then added 40 grams of 50% sodium hydroxide solution (½ mole) and 48 grams (slightly more than ½ mole) of chloroacetone and the mixture is agitated and heated under gentle reflux for an additional three hours. A greater excess of anhydrous ethanol facilitates the esterification and such excess is preferred.

The excess alcohol and unreacted materials are removed by distillation under reduced pressure and the residual oil is washed successively with sodium carbonate solution and water. The oil is then distilled in vacuum. The boiling point of the ethyl acetonyl phthalate is 164°–168° C. at a pressure of 5 mm. of mercury; it begins to distill at 320°–327° C. (with decomposition) at atmospheric pressure. The refractive index of the purified compound is 1.5103 at 24.5° C.

The yield can be improved if the sodium salt of the monoethyl ester of phthalic acid as prepared above is first recovered and dried before reaction with the chloroacetone. In this case additional absolute ethyl alcohol is added as diluent to the mixture during the heating.

Further improvement in the yield can be obtained by forming the sodium salt of the monoethyl phthalate by adding anhydrous sodium carbonate or potassium carbonate to the previously refluxed mixture of phthalic anhydride and absolute alcohol and by refluxing the mixture after addition of chloroacetone for a longer period.

*Example 2.—Butyl acetonyl phthalate.* One mole of phthalic anhydride and 3 moles of anhydrous normal-butanol are heated gently for a fraction of an hour in an apparatus provided with a stirrer and means for removing water which passes over in the reflux. One-half mole of anhydrous sodium carbonate is then added and refluxing continued for about ½ hour. Slightly more (5% excess) than 1 mole of chloroacetone is then added and the mixture is agitated and heated gently under reflux for about 10 hours.

The excess butanol and other unreacted substances are removed by distillation in vacuum and the butyl acetonyl phthalate is recovered in a manner similar to that described in Example 1. Further impurities can be removed by passing steam through the hot ester.

The product, if dark in color, can be subjected to decolorization, for example, by means of an acid permanganate treatment. Such decolorizing treatments are applicable generally to the compounds of the invention.

The n-butyl acetonyl phthalate obtained in this manner begins to boil with slight decomposition at a temperature of 332°–333° C. at atmospheric pressure.

*Example 3.—Ethyl butanonyl phthalate.* By substituting a chlorinated mixture of methyl ethyl ketone for the chloroacetone used in Example 1, the corresponding butanonyl phthalate can be prepared. The compound obtained from the chlorinated ketone mixture in this manner is a mixture of isomers, the relative proportions of which are determined by the composition of the chlorinated mixture. Chlorinated methyl ethyl ketone mixtures generally contain predominant quantities of the beta isomer, $CH_3CH(COCH_3)Cl$.

An underchlorinated methyl ethyl ketone mixture is advantageously used in the preparation for the reasons mentioned hereinbefore. If desired, pure individual chlorobutanones, which can readily be separated from the chlorinated mixture by fractional distillation, can be used.

The ethyl butanonyl phthalate prepared from a chlorinated methyl ethyl ketone mixture begins to boil with slight decomposition at 326°–327° C. at a pressure of 763.5 mm.

From the foregoing description it will be apparent that the invention is susceptible of many modifications within the knowledge of those skilled in the art and that the invention is not limited to the examples specifically set forth but rather contemplates the general class of esters as herein characterized and defined in the appended claims.

What I claim is:

1. A neutral ester corresponding to a dicarboxylic acid in which one carboxyl group is esterified with a ketone alcohol and the other carboxyl group is esterified with a hydroxy compound selected from the group consisting of monohydric alcohols and ethers of polyhydric alcohols having one free esterifiable hydroxyl group.

2. A neutral ester of a dicarboxylic acid in which one carboxyl residue is joined to an alkanonyl group and the other carboxyl residue is joined to an alkyl group.

3. A neutral ester of a dicarboxylic acid represented by the formula

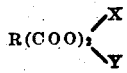

in which X is an alkyl group, Y is an alkanonyl group and R is a hydrocarbon residue.

4. A neutral ester of a dicarboxylic acid in which one carboxyl residue is joined to an acetonyl group and the other to an alkyl group.

5. A neutral ester of phthalic acide in which one carboxyl residue is joined to an alkanonyl group and the other to an alkyl group.

6. Ethyl acetonyl phthalate, having an approximate boiling point of 164°–168° C. at a pressure of 5 mm. of mercury and a refractive index of approximately 1.510 at 25° C., said compound being further characterized by pronounced plasticizing action on cellulose esters and ethers.

7. A butyl acetonyl phthalate, having a boiling point of approximately 332° C. at atmospheric pressure, said compound being further characterized by pronounced plasticizing action on cellulose esters and ethers.

8. An ethyl butanonyl phthalate, having a boiling point of approximately 326° C. at atmospheric pressure, said compound being further characterized by pronounced plasticizing action on cellulose esters and ethers.

LUCAS P. KYRIDES.